United States Patent
Deal et al.

[11] Patent Number: 5,844,215
[45] Date of Patent: Dec. 1, 1998

[54] FOOD PREPARING TOOL

[75] Inventors: Larry C. Deal, Batesville; Lloyd DePriest, Marshall, both of Ark.

[73] Assignee: Deal Products Corp., Jonesboro, Ark.

[21] Appl. No.: 910,861

[22] Filed: Aug. 13, 1997

[51] Int. Cl.$^6$ ........................................................ B65D 1/40
[52] U.S. Cl. ............................................ 219/732; 99/419
[58] Field of Search ................................... 219/734, 732, 219/10.55; 99/419, DIG. 14, 421 V, 426

[56] References Cited

U.S. PATENT DOCUMENTS

| | | | |
|---|---|---|---|
| 4,558,197 | 12/1985 | Wyatt | 219/10.55 |
| 4,896,011 | 1/1990 | Trucks | 219/10.55 |
| 5,132,501 | 7/1992 | Green | 219/10.55 |

*Primary Examiner*—Teresa Walberg
*Assistant Examiner*—Jeffrey Pwu
*Attorney, Agent, or Firm*—Stephen D. Carver

[57] ABSTRACT

A food preparing utensil which has a flexible body supporting several food puncturing spikes. The body is formed by a trunk between spaced apart, axially aligned and integral handles. The trunk is formed by a plate with a depression bounded by peripheral sidewalls. Handles extending outwardly from each side of the trunk are formed by a panel with an indentation bounded by peripheral sidewalls. When the utensil is deployed, the user places their fingers in the indentations. Several food puncturing spikes protrude outwardly from the trunk bottom to penetrate the food item. Each generally pyramidal spike is in the form of an elongated, tapering shaft with a rounded tip. The shaft has a center core that extends from the shaft origination at the trunk to tip. The core is peripherally bounded by several regularly spaced apart blades that cut their way out of prepared food to prevent utensil lodging. When used, the user places their thumbs in the depression while placing their fingers in the handle indentations. The utensil spikes punctures food to create ducts for venting the food interior. To deploy the utensil, the user grasps the handles with their fingers while placing their thumbs against the trunk and then forcefully thrusting the spikes against the food. The user continues thrusting until the spikes penetrate the food. The user may then flex the utensil to ensure that the spikes slide upward easily during removal. The user may subsequently remove the utensil from the food by lifting upwardly with their fingers while immobilizing the food with their thumbs.

17 Claims, 6 Drawing Sheets

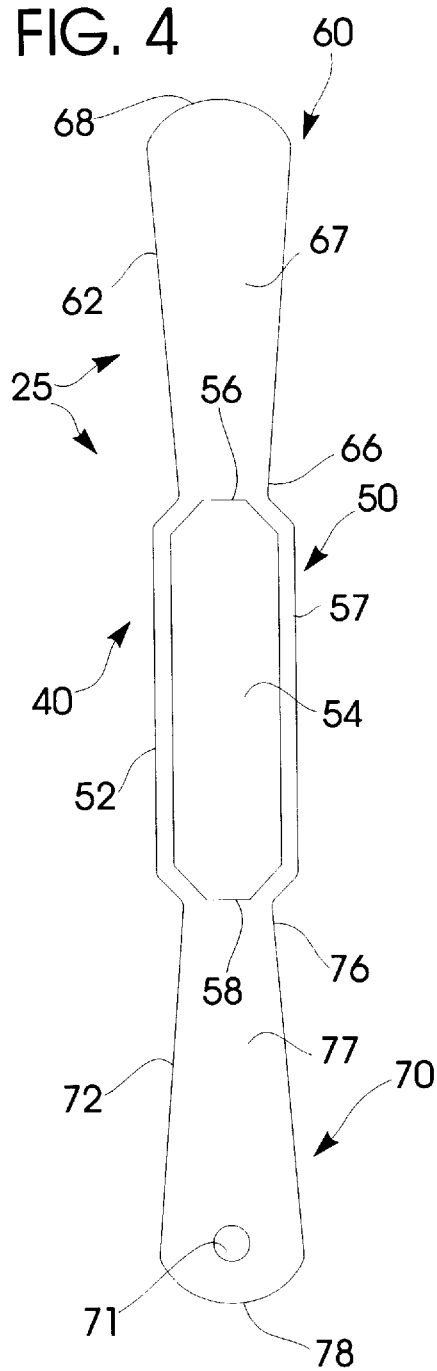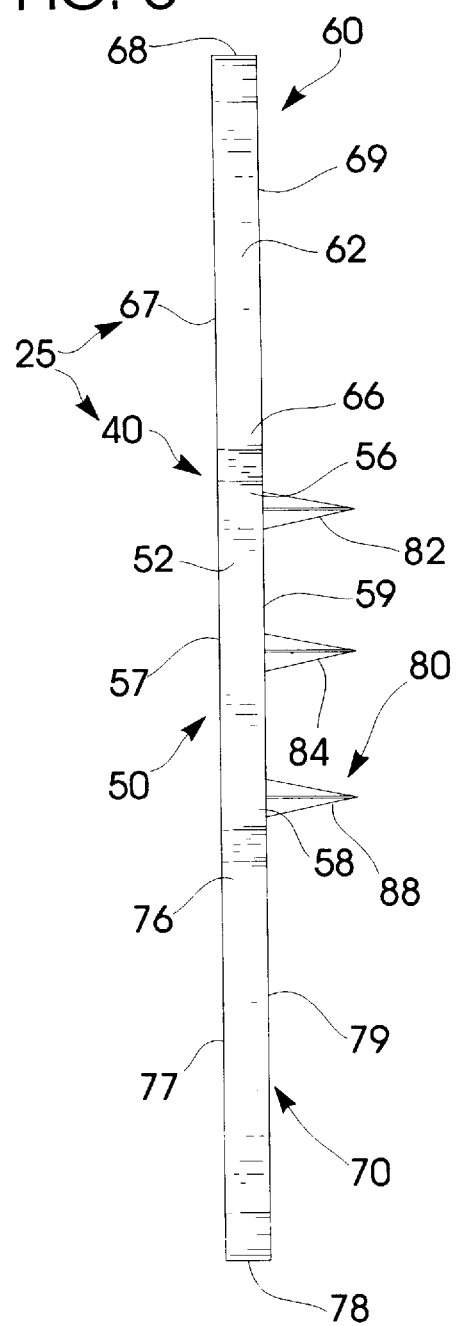

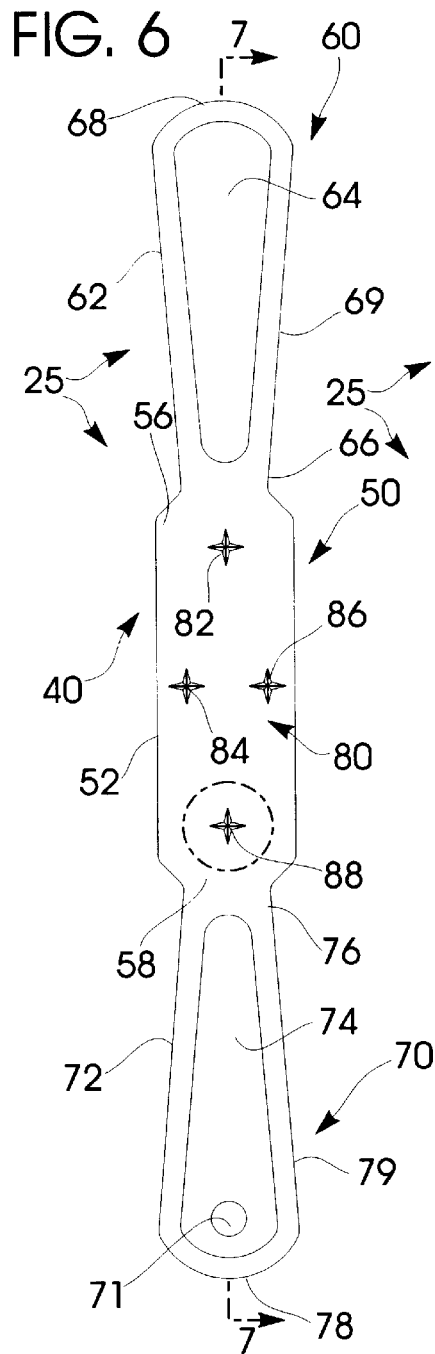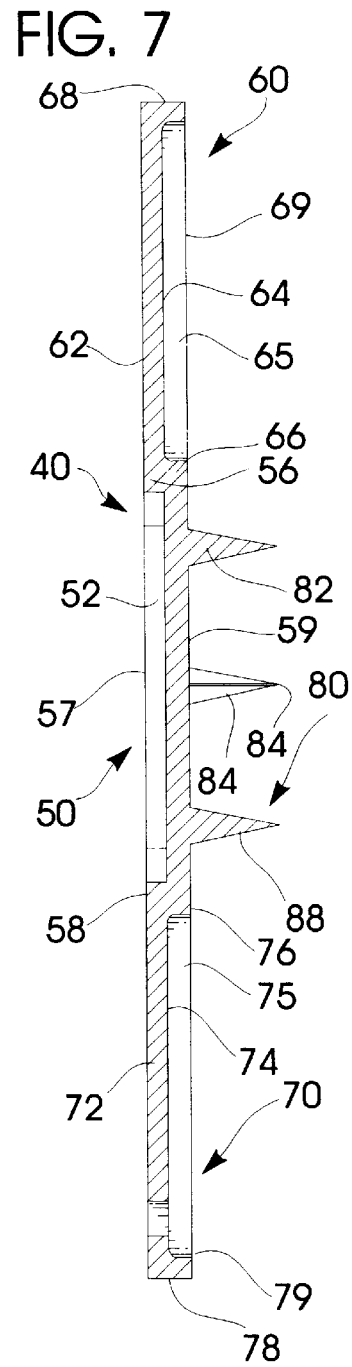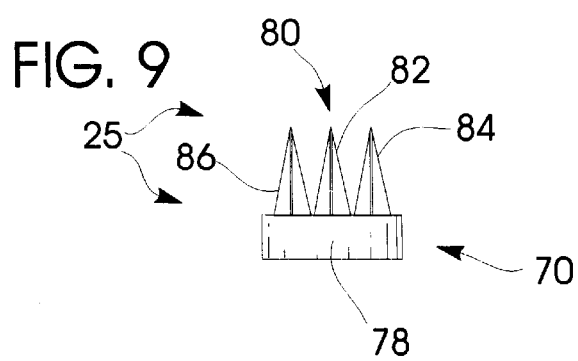

FOOD PREPARING TOOL

BACKGROUND OF THE INVENTION

I. Field of the Invention

The present invention relates generally to food preparing tools for microwave cooking and the like. In particular, the present invention relates to a food preparing tool that efficiently punctures and aerates various foods, including fruits and vegetables and particularly potatoes, prior to cooking. Related prior art may be found in U.S. Classes 99 and 219 and the subclasses thereunder.

II. Description of the Prior Art

As will be recognized by those skilled in the art, microwave cooking is a fairly recent phenomenon that requires specialized procedures and utensils. Many foods that were prepared in known manners for conventional ovens require completely different preparation techniques for microwave oven cooking. For example, potatoes and the like must have their exterior skins pierced to permit the escape of steam from their interiors during cooking. Otherwise, the potato skin will not permit the steam to exit the interior until the resultant pressure increase causes the potato skin to rupture and/or explode violently.

One method of venting the potato interior involves piercing the potato's skin several times with a conventional fork. However, this method does not produce uniform vents and it is fraught with hazards for the user. It is not uncommon for the user to puncture their extremities (i.e., fingers, thumbs, hands, etc.) while forcefully striking the potato with the fork tines. Such contact is often painful and always undesirable.

Other tools for solving problems associated with cooking potatoes in microwave ovens have been proposed. The known prior art includes several devices for cooking potatoes and the like. For example, U.S. Pat. Nos. 4,558,197, 5,132,501 and 4,895,011 show devices for cooking potatoes in microwaves. The first two show trays for holding multiple potatoes while the latter show a single spike for supporting a solitary potato. The first two fail to address the need of puncturing the potato's skin prior to microwave cooking to prevent an explosion. The latter deals with the problem by making a single large hole near the middle of the potato.

However, this device fails to make multiple punctures in the potato skin to adequately vent the interior. Furthermore, the known devices often fail to adequately ventilate the center of the potato to prevent undesirable explosions during microwave cooking.

Moreover, these devices fail to adequately address the need of user safety. The primary irritant with microwave cooking of potatoes is the pricks that result from misplaced jabs at the potato that hit the user's extremities. This jabs and/or pricks are quite often very painful. The conventional fork method inevitably leads to a high degree of puncture wounds.

A desirable tool would prevent such wounds. A tool that enabled the user to quickly puncture the potato in multiple locations would also be an improvement. A tool that kept the user's extremities at a safe distance from the food piercing instrumentality would also be a desirable improvement.

A further improvement would be a tool that enabled the user to deeply puncture the potato to adequately ventilate the potato interior. Preferably, the tool would penetrate the potato and the meat of the potato in singular thrusts to more efficiently prepare the potato for cooking.

SUMMARY OF THE INVENTION

Our improved food preparing tool overcomes the above referenced problems associated with the known prior art. The utensil is manipulated by a user to prepare food for subsequent cooking. It is particularly efficient for preparing foods such as potatoes for microwave cooking.

The utensil comprises a body supporting several food puncturing spikes. The body comprises a trunk between two spaced apart integral handles. Preferably, the trunk and handles are approximately the same length. In other words, the combined length of the handles is approximately twice that of the trunk.

The trunk comprises a plate with a central depression bounded by peripheral sidewalls. When the utensil is deployed, the user places their thumbs in the depression while grasping the handles with their fingers.

The handles extend, generally axially outwardly way from each end of the trunk. Each handle comprises a panel with a central indentation bounded by peripheral sidewalls. When the utensil is deployed, die indentations can seat the user's fingers to avoid contact with the spikes. A support hole in at least one of the handles enables the utensil to be readily suspended from a peg for storage.

Several food puncturing spikes protrude outwardly from the trunk bottom to penetrate the food item during preparation. In the preferred embodiment, four spikes are distributed in a diamond shaped array adjacent the trunk perimeter. Each spike comprises an elongated tapering shaft with a rounded tip. The shaft comprises a center core that extends from the shaft origination at the trunk to tip. The core is peripherally bounded by several regularly spaced apart blades that prevent utensil "sticking" in the food. The utensil punctures the food to create ventilation ducts that may receive marinades or for venting the food interior during cooking.

For deployment, the user gasps the handle with their fingers while placing their thumbs against the trunk. Preferably, the user's thumbs are both placed in the trunk depression while their fingers are placed in the handle indentations. Thus, the user avoids potentially extremity contact with the spikes during utensil deployment. Consequently, the risk of finger or thumb pricking is eliminated during utensil deployment. The concurrent placement of the user's thumbs in the trunk depression their fingers in the handle indentations also facilitates accurate utensil flexing during spike removal.

After the user has appropriately grasped the utensil, the user forcefully thrusts the utensil against the food. The user continues thrusting until the spikes penetrate the food. The user may then flex the utensil to ensure that the spikes slide upward easily during removal. In order to flex the utensil, the user continues thrusting downwardly with their thumbs while lifting upwardly with their fingers to "flex" or bend the utensil adjacent the middle of the trunk. This flexing movement causes the spike blades to move inside the food to simultaneously enlarge the ducts while cutting the foods away from the spikes. The user may subsequently remove the utensil from the food by lifting upwardly with their fingers while immobilizing the food with their thumbs.

Thus, a primary object of the present invention is to provide a tool that enables a user to quickly and efficiently prepare food for cooking.

A related object is to provide a tool that punches multiple holes in food to prepare it in a single step.

Another related object of the present invention is to provide a tool for quickly preparing a potato for microwave cooking.

Another primary object of this invention is to provide a tool that may be easily removed from the food when the food is suitably prepared.

Another basic object is to provide an utensil that doesn't stick to the interior of the food as it is removed therefrom.

A related object of the invention is to provide a tool that may be easily withdrawn from prepared food.

A basic object of the present invention is to provide a tool that prevents abrasive contact of the tool with the user's extremities.

A related basic object is to provide tool that permits the user to punch holes in food without pricking their extremities.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 4 is a bottom plan view;

FIG. 5 is a side elevational view, with the opposite side being a mirror image thereof;

FIG. 6 is a top plan view;

FIG. 7 is a cross-sectional view taken along Line 7—7 in FIG. 6;

FIG. 9 is an end elevational view, with the opposite side being a mirror image thereof;

DETAILED DESCRIPTION

Figure 1:
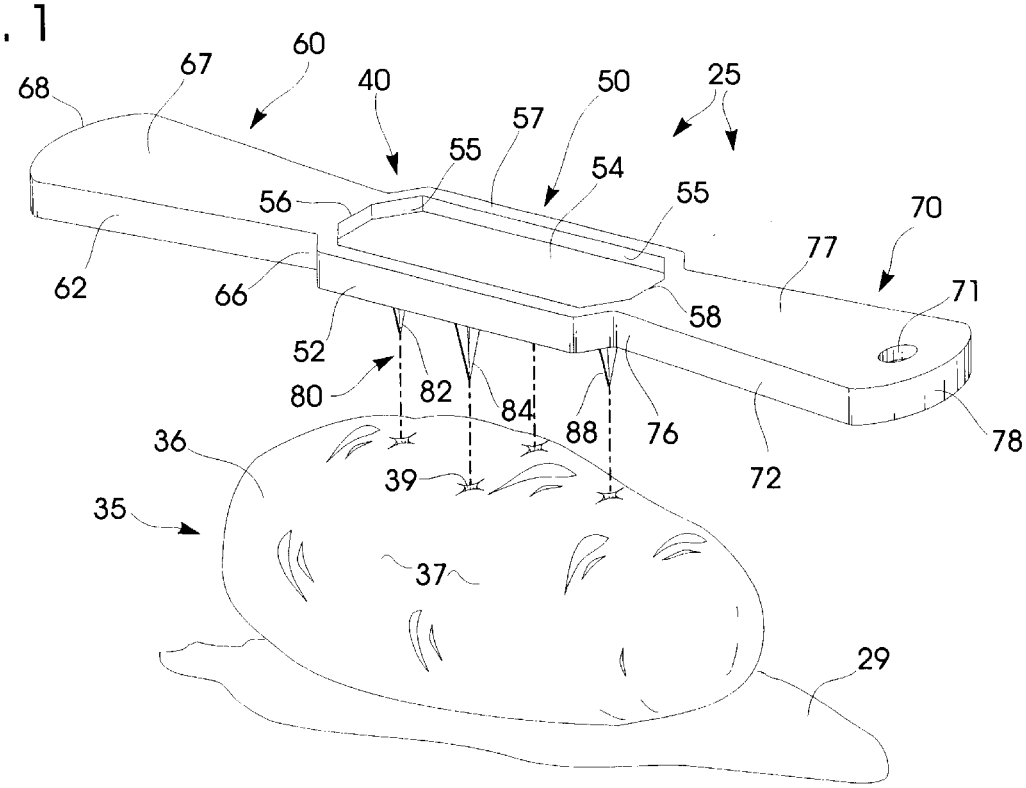
FIG. 1 is an environmental view showing the preferred embodiment of my invention in use with a potato.
Figure 2:
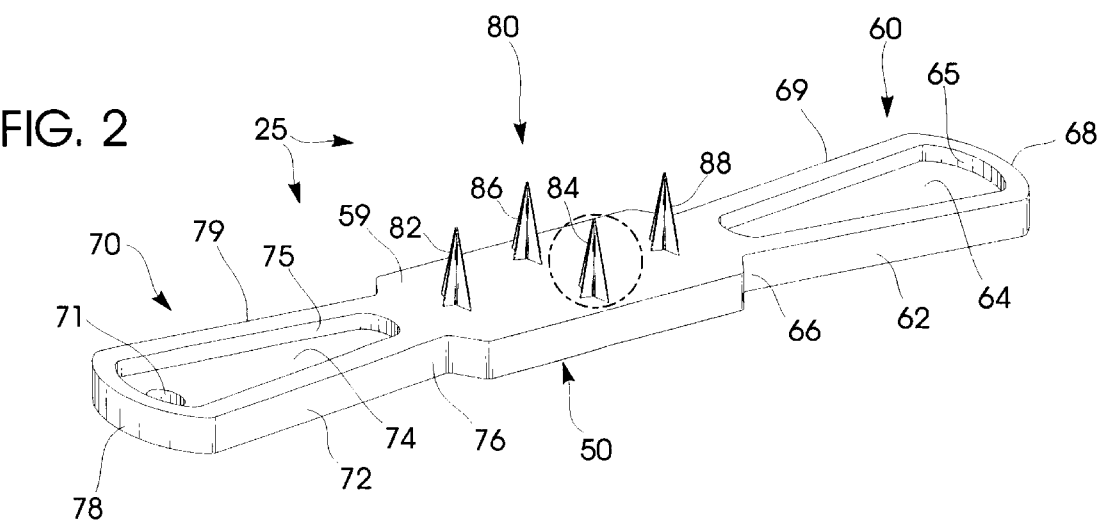
FIG. 2 is an isometric view showing the invention.

Referring more specifically to the drawings, our improved food preparing tool is generally designated by reference numeral 25 in FIGS. 1–15. The tool or utensil 25 is manipulated by a user 30 to prepare food 35 for subsequent cooking. Tool 25 is particularly efficient for preparing foods such as potato 36 for microwave cooking.

Tool 25 comprises an elongated, planar body 40 supporting several food puncturing spikes 80. Preferably, tool 25 is injection molded from food grade plastic. In the best embodiment, utensil 25 is a unitary molding that is top-rack dishwasher safe. Body 40 comprises a trunk 50 between two spaced apart integral handles 60 and 70 (FIGS. 1–9). Preferably, the trunk 50 and handles 60, 70 are approximately the same length. In other words, the trunk 50 forms a third of the body length while handles 60, 70 form the other two thirds of the overall body length. Thus, the combined length of handles 60, 70 is approximately twice that of the trunk 50.

Trunk 50 comprises a plate 52 with a central depression 54. Depression 54 is bounded by sidewalls 55. When utensil 25 is deployed, depression 54 is adapted to receive the user's thumbs 32, as will be discussed more thoroughly hereinafter. The trunk 50 further comprises a pair of opposite sides 56, 58 as well as a top 57 and a bottom 59. Preferably, handles 60, 70 protrude from opposite sides 56, 58 of the trunk 50.

Handle 60 extends outwardly from trunk side 56. Handle 60 comprises a panel 62 with a central indentation 64. Indentation 64 is bounded by sidewalls 65. When utensil 25 is deployed, identification 64 is adapted to receive the fingers 33 of one of the user's hands, as will be discussed more thoroughly hereinafter. Handle 60 comprises a narrow neck 66 that widens to an arcuate terminus 68. Handle 60 also comprises a top 67 and a bottom 69.

Handle 70 integrally protrudes outwardly from trunk side 58. Handle 70 comprises a panel 72 with a central indentation 74. Indentation 74 is bounded by sidewalls 75. As with handle 60, when utensil 25 is deployed indentation 74 is adapted to receive the fingers 34 of the user's other hand, as will be discussed more thoroughly hereinafter. Handle 70 comprises a narrow neck 66 that widens to an arcuate terminus 78. Handle 70 also comprises a top 77 and a bottom 79 in which indentation 74 is defined. Preferably, handle 70 is penetrated adjacent terminus 78 by a hole 71 that permits utensil 25 to be hung on a peg or the like to facilitate convenient storage.

Figure 13:
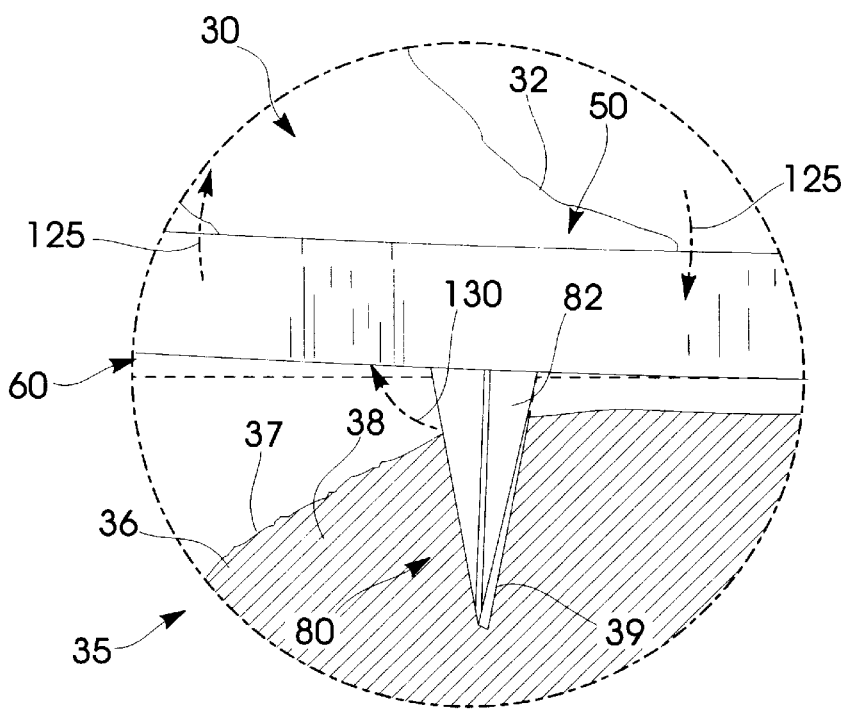
FIG. 13 is an enlarged view of the encircled area of FIG. 12, showing the blades cutting the potato as the invention is flexed by the user.

As mentioned earlier, the body 40 supports several food puncturing spikes 80 that protrude outwardly from trunk bottom 59. The spikes 80 penetrate the potato's skin 37 and meat 38 during food preparation to form ventilation ducts 39 when appropriately manipulated by user 30 (as best shown in FIG. 13).

The somewhat pyramidal spikes 80 emanate from the trunk bottom 59 (FIGS. 1–9). In the preferred embodiment, four spikes 82–88 are distributed adjacent the perimeter of trunk 50. Preferably spike 82 is adjacent trunk side 56 while spike 88 is adjacent side 58 while the inner spikes 84, 86 are adjacent the middle of trunk 50.

Figure 3:
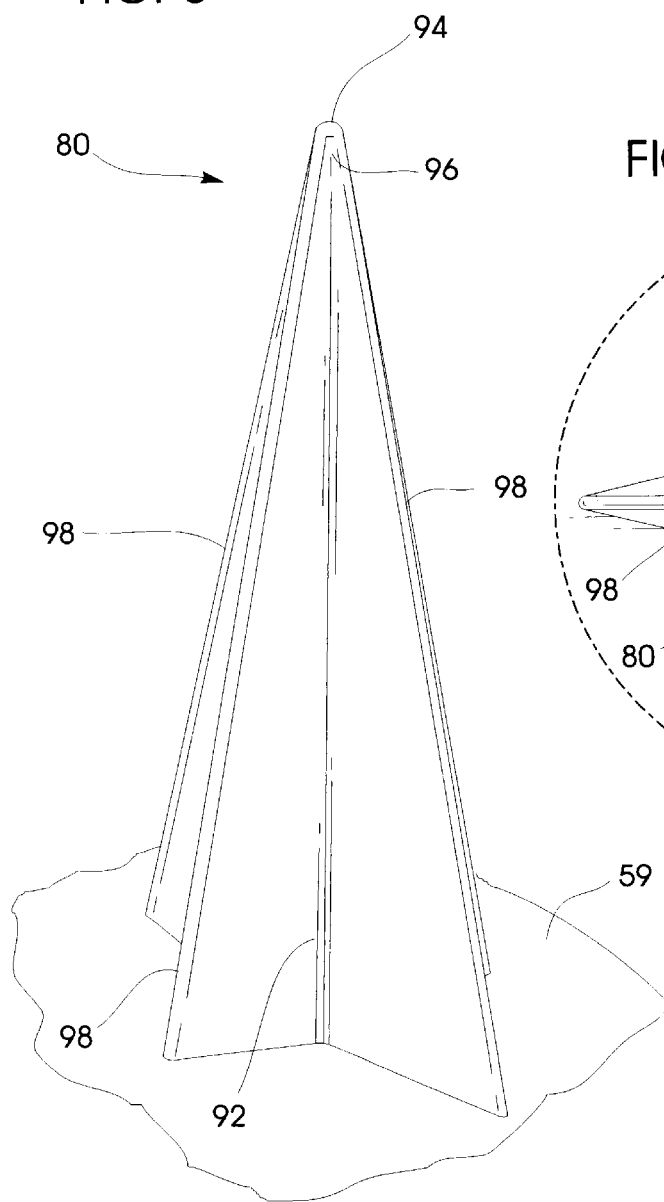
FIG. 3 is enlarged view of the encircled area of FIG. 2.
Figure 8:
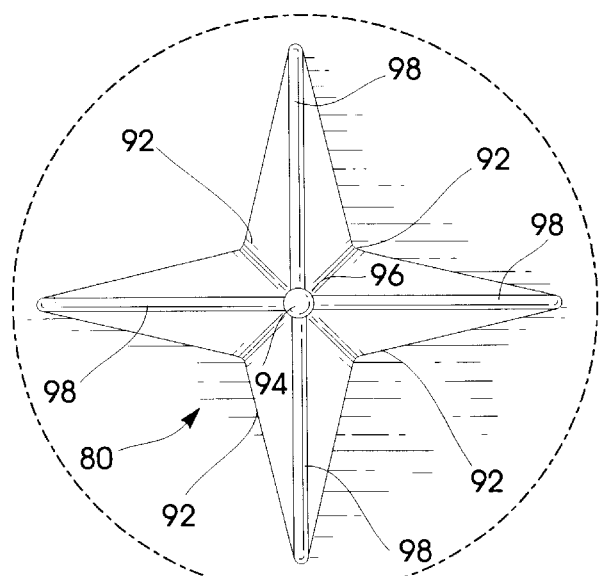
FIG. 8 is an enlarged view of the encircled area of FIG. 6.

Each spike 82–88 preferably comprises an elongated tapering shaft 92 with a rounded tip 94 (FIGS. 3, 8). The shaft 92 comprises a center core 96 that extends from the shaft origination at trunk bottom 59 to tip 94. The core 96 is peripherally bounded by several regularly spaced apart blades 98. During use, the blades 98 ensure that the utensil 25 is released by the previously penetrated food item (i.e., the potato) as the utensil 25 is lifted upwardly by the user 30. In other words, the blades 98 prevent the spikes 82–88 from "sticking" inside the potato, as will be discussed thoroughly hereinafter.

OPERATION

When the utensil 25 is properly manipulated by user 30, foods such as potato 36 may be easily prepared for subsequent cooking (FIGS. 10–15). Utensil 25 punctures the food 35 to create ventilation ducts 39. Ducts 39 may receive marinades or the like or they may effectively vent the food interior during cooking. For example, ducts 38 permit the timely evacuation of steam and other gasses from the potato's interior meat 39 through the less permeable outer skin 37 during microwave cooking.

To deploy utensil 25, the user 30 grasps handle 60 with fingers 33 and handle 70 with fingers 34. Preferably, the users's thumbs are both placed in depression 54 while the user's fingers 33 are placed in indentation 64 and fingers 34 are placed in indentation 74. The placement of fingers 33, 34 in indentations 64, 74 prevents inadvertent finger contact with spikes 80 during utensil deployment. Thus, the risk of finger or thumb pricking is eliminated during utensil deployment. The concurrent placement of thumbs 32 in depression 54 and fingers 33, 34 in indentations 64, 74 also facilitates accurate utensil flexing during spike removal, as will be discussed more fully.

Figure 10:
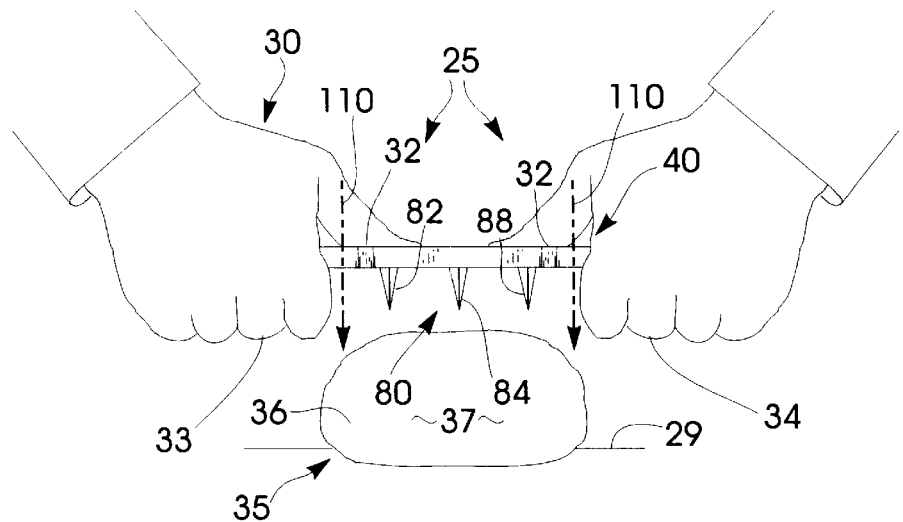
FIG. 10 is a side elevational view showing the invention as grasped by a user.
Figure 11:
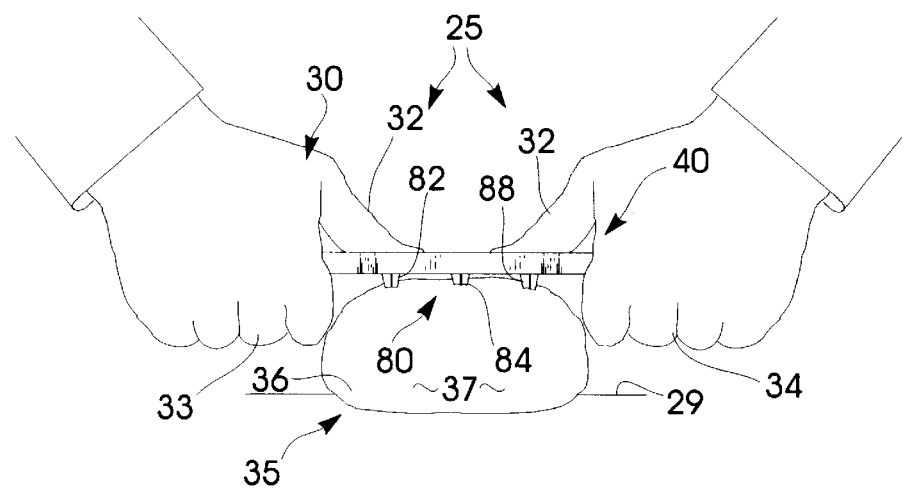
FIG. 11 is a side elevational view showing the invention inserted into a potato.

After the user 30 has appropriately grasped the utensil 25, the user 30 forcefully thrusts the utensil against the food 35 (as indicated by arrows 105 in FIG. 10). For example, the user 30 presses utensil 25 and spikes 80 against the outer skin 37 of potato 36 as it rests upon surface 29. The user continues thrusting until the spikes 80 penetrate the potato 36 sufficiently to enable body 50 to rest adjacent potato skin 37 (FIG. 11).

Figure 12:
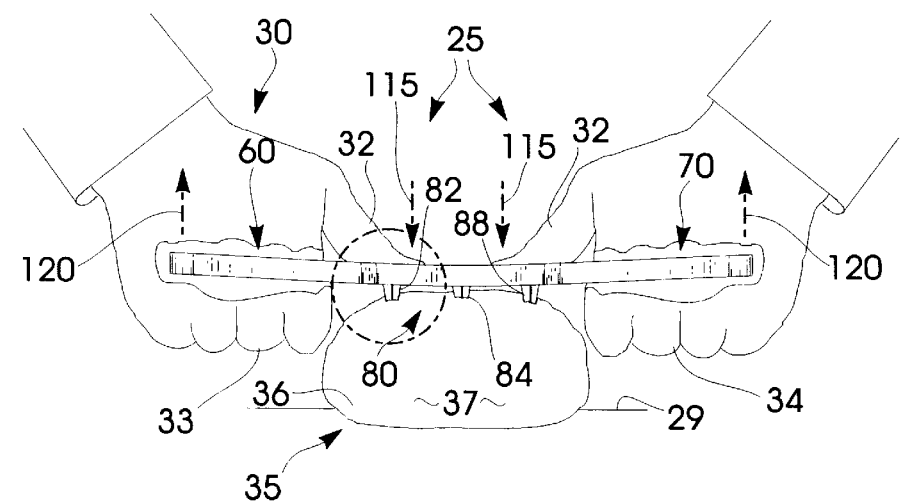
FIG. 12 is a side elevational view showing the user flexing the invention to ensure its release from the potato.

The user 30 may then flex the utensil 25 to ensure that the spikes 80 slide upward easily during removal (FIGS. 12–13). In order to flex utensil 25, the user continues thrusting downwardly with thumbs 32 in the direction indicated by arrows 115 in FIG. 12 while lifting upwardly with fingers 33, 34 in the direction indicated by arrows 120. The counteracting forces produced by the thumbs 32 and fingers 33, 34 cause the utensil 25 to "flex" or bend; preferably adjacent the middle of trunk 50 (FIG. 13). This flexing movement (as indicated by arrows 125 in FIG. 13) causes the spike blades 98 to move inside potato 36 (as indicated by arrows 130), simultaneously enlarging ducts 38 while cutting the meat 38 away from the spikes 82–88.

Figure 14:
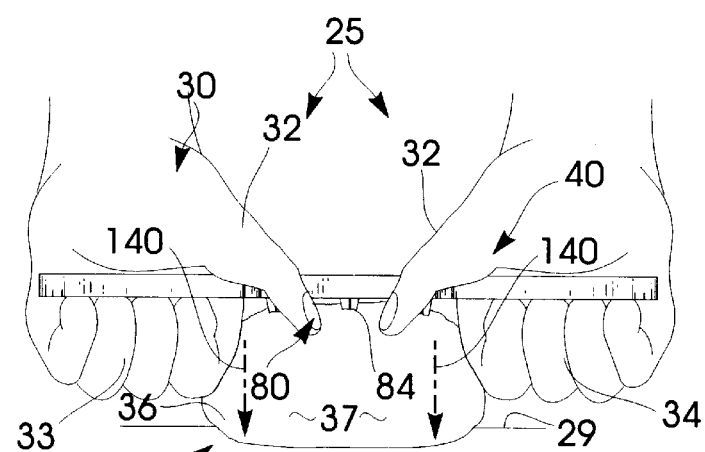
FIG. 14 is a side elevational view showing the user's thumbs immobilizing the potato immediately prior to the removal of the invention therefrom; and, FIG. 15 is a side elevational view showing the removal of the invention from the potato.
Figure 15:
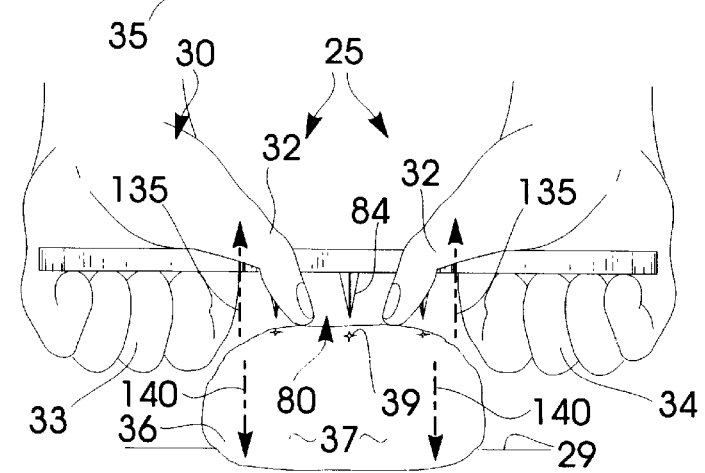

The user 30 may subsequently remove the utensil 25 from the potato 36 easily (FIGS. 14–15). The user 30 simply lifts upwardly with fingers 33 and 34 (as indicated by arrows 135 in FIG. 15). Preferably, the user 30 immobilizes potato 26 by pressing downwardly thereon with thumbs 32 (as indicated by arrows 140).

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims. As many possible embodiments may be made of the invention without departing from the scope thereof, it is to be understood that all matter herein set forth or shown in the accompanying drawings is to be interpreted as illustrative and not in a limiting sense.

What is claimed is:

1. A one-piece, flexible, hand-held food preparation utensil comprising:

an elongated, resilient and flexible, generally flat body comprising a solid central trunk comprising a pair of ends and a pair of integral handles adapted to be grasped by a user for bending the utensil, the handles substantially aligned with the trunk and extending from opposite ends thereof;

a plurality of projecting spikes protruding from said trunk for puncturing a food item to be cooked when the user forcefully presses the utensil against the food; and thumb rest means for facilitating flexing the body by the users thumbs, said thumb rest means comprising a central depression defined upon said trunk for seating and protecting the user's thumbs when operating said utensil.

2. The utensil as defined in claim 1 wherein each of said handles further comprises an indented bottom adapted to seat the user's fingers during utensil manipulation to prevent inadvertent contact with said spikes.

3. The utensil as defined in claim 1 wherein each of said spikes comprises means ensuring the release of said utensil from said food as the user immobilizes the food with their thumbs while lifting upwardly on said handles.

4. The utensil as defined in claim 3 wherein said means for ensuring comprises a central core bounded by plurality of regularly spaced apart, tapered blades extending from said body to said tip.

5. The utensil as defined in claim 4 wherein said blades cut into the food during spike entry and cut away the food during spike removal to ensure said spikes are released therefrom.

6. A one-piece, flexible, hand-held utensil for preparing potatoes for microwave cooking, said utensil comprising:

an elongated resilient body comprising a central, flat solid trunk adapted to be contacted by the thumbs of a user, the trunk having opposite ends, and a pair of integral, outwardly protruding handles adapted to be grasped by the fingers of the user, the handles substantially coplanar with said trunk and joined to said opposite ends thereof;

a plurality of projecting spikes protruding from said trunk for puncturing the skin and meat of a potato when the user forcefully presses the utensil against the potato;

means associated with said trunk for seating the users thumbs;

means associated with said handles for seating the users fingers;

whereby said utensil may be firmly grasped by the user to forcibly penetrate the potato with said spikes without contacting the user's thumbs or fingers, and the utensil may thereafter be flexed by the users hands to deflect the spikes facilitating removal of the utensil from the potato.

7. The utensil as defined in claim 6 wherein said means associated with said trunk for seating the users thumbs comprises a depression adapted to be contacted by a user's thumbs when pressing said utensil into the potato, said depression formed in said trunk and bounded by a peripheral sidewall.

8. The utensil as defined in claim 7 wherein said means associated with said handles for seating the users fingers comprises an indented bottom formed in said handles and adapted to seat the user's fingers during utensil manipulation to prevent inadvertent contact with said spikes.

9. The utensil as defined in claim 6 wherein:

each of said spikes comprise an elongated shaft with a rounded tip; and, each of said shafts further comprises means ensuring the release of said utensil from said potato as the user immobilizes the potato with their thumbs while lifting upwardly on said handles.

10. The utensil as defined in claim 9 wherein each of said shafts comprises a central core bounded by a plurality of regularly spaced apart, tapered blades extending from said body to said tip.

11. The utensil as defined in claim 10 wherein said blades cut into the skin and meat of the potato during spike entry and cut away the skin and meat of the potato as necessary during spike removal to ensure said spikes are released therefrom.

12. The hand-held, flexible utensil for preparing potatoes for microwave cooking by puncturing the skin and meat of the potato to ventilate the potato interior, said utensil comprising:

an elongated resilient body comprising a central trunk adapted to be contacted by the thumbs of a user and a pair of integral, outwardly protruding handles adapted to be grasped by the fingers of the user;

a depression defined in said trunk for safely seating and protecting the users thumbs;

depressions defined in said handles for safely seating and protecting the users fingers;

a plurality of projecting spikes protruding from said trunk for puncturing the skin and meat of a potato when the user forcefully presses the utensil against the potato, each of said spikes comprising means for ensuring the release of said utensil from said potato as the user presses on the potato with their thumbs while lifting upwardly on said handles; and, whereby said utensil may be firmly grasped by the user to forcibly penetrate the potato with said spikes without contacting the user's thumbs or fingers, and the utensil may be thereafter flexed by the users hands to deflect the spikes facilitating removal of the utensil from the potato.

13. The utensil as defined in claim 12 wherein each of said means for ensuring comprises an elongated shaft with a rounded terminal tip, and a central core bounded by a plurality of regularly spaced apart, tapered blades extending from said body to said tip.

14. The utensil as defined in claim 13 wherein said blades cut into the skin and meat of the potato during spike entry and cut away the skin and meat of the potato as necessary during spike removal to ensure said spikes are released therefrom.

15. The utensil as defined in claim 13 wherein each of said spikes is generally pyramidal.

16. The utensil as defined in claim 13 wherein each spike comprises an elongated shaft with a rounded tip.

17. The utensil as defined in claim 15 wherein each spike comprises an elongated shaft with a rounded tip.

\* \* \* \* \*